(12) United States Patent
Vernault et al.

(10) Patent No.: US 12,503,742 B2
(45) Date of Patent: Dec. 23, 2025

(54) CASE-HARDENED STEEL PART FOR USE IN AERONAUTICS

(71) Applicant: SAFRAN HELICOPTER ENGINES, Bordes (FR)

(72) Inventors: Cyril Roger Vernault, Moissy-Cramayel (FR); Bruno Petroix, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 815 days.

(21) Appl. No.: 17/607,998

(22) PCT Filed: Apr. 30, 2020

(86) PCT No.: PCT/EP2020/062142
§ 371 (c)(1),
(2) Date: Nov. 1, 2021

(87) PCT Pub. No.: WO2020/221900
PCT Pub. Date: Nov. 5, 2020

(65) Prior Publication Data
US 2022/0290268 A1   Sep. 15, 2022

(30) Foreign Application Priority Data
May 2, 2019  (FR) ...................................... 1904634

(51) Int. Cl.
*C21D 9/32*        (2006.01)
*C21D 6/00*        (2006.01)
(Continued)

(52) U.S. Cl.
CPC ............... *C21D 9/32* (2013.01); *C21D 6/001* (2013.01); *C21D 6/007* (2013.01); *C21D 6/04* (2013.01);
(Continued)

(58) Field of Classification Search
CPC .......... C21D 1/06; C21D 6/001; C21D 6/007; C21D 6/04; C21D 9/32; C22C 38/06;
(Continued)

(56) References Cited

U.S. PATENT DOCUMENTS

2019/0194793 A1* 6/2019 Rigo .......................... C23C 8/02

FOREIGN PATENT DOCUMENTS

| CN | 108118260 A | 6/2018 |
|---|---|---|
| CN | 109338280 A | 2/2019 |
| EP | 3 502 302 A1 | 6/2019 |

OTHER PUBLICATIONS

French Search Report of application 1904634 dated Jan. 29, 2020.
(Continued)

*Primary Examiner* — Lois L Zheng
(74) *Attorney, Agent, or Firm* — BIRCH, STEWART, KOLASCH & BIRCH, LLP

(57) ABSTRACT

The present invention relates to a steel part for use in aeronautics, comprising a substrate, the substrate comprising at least carbon, cobalt, aluminium and nickel, and having an average atomic fraction of carbon between 0.09% and 0.17%, an average atomic fraction of cobalt between 15.5% and 18.5%, an average atomic fraction of aluminium less than 0.1%, an average atomic fraction of nickel between 7.2% and 9.8%, the part being case-hardened and also comprising a nitrided layer, the nitrided layer at least partially covering the substrate and having a thickness between 5 μm to 180 μm, preferably between 50 μm and 150 μm.

8 Claims, 3 Drawing Sheets

(51) Int. Cl.
  *C21D 6/04*    (2006.01)
  *C22C 38/06*   (2006.01)
  *C22C 38/10*   (2006.01)
  *C23C 8/34*    (2006.01)

(52) U.S. Cl.
  CPC ............ *C22C 38/06* (2013.01); *C22C 38/105* (2013.01); *C23C 8/34* (2013.01)

(58) Field of Classification Search
  CPC ....... C22C 38/105; C22C 38/34; C22C 38/44; C22C 38/52
  See application file for complete search history.

(56) References Cited

OTHER PUBLICATIONS

Gorockiewicz et al., "The LPC Process for High-Alloy Steel", Vacuum, 2008, pp. 42-51, XP055421497.
International Search Report (PCT/ISA/210) issued in PCT/EP2020/062142 mailed on May 27, 2021.
Wiedmann, "Neue Wege Bei Der Waermebehandlung Und Oberflaechenbehandlung Hochbelasteter Luftfahrt-Getriebebauteile", HTM Haerterei Technische Mitteilungen: Zeitschrift Fuer Werkstoffe, Waermebehandlung Und Fertigung, Carl Hanser Verlag Munchen, DE, vol. 55 No. 1 Jan. 1, 2000 pp. 59-64 XP000893946.
Written Opinion (PCT/ISA/237) issued in PCT/EP2020/062142 mailed on May 27, 2021.

\* cited by examiner

[Fig. 1]
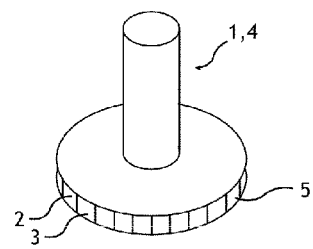
[Fig. 2]
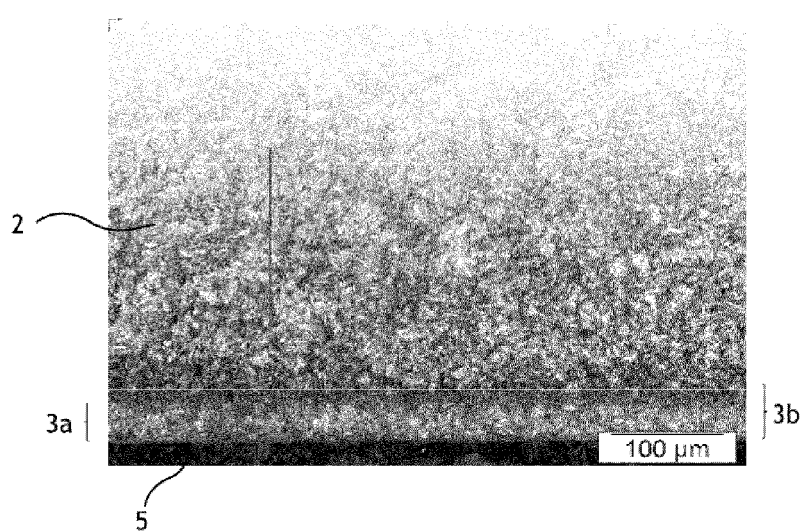

[Fig. 3]
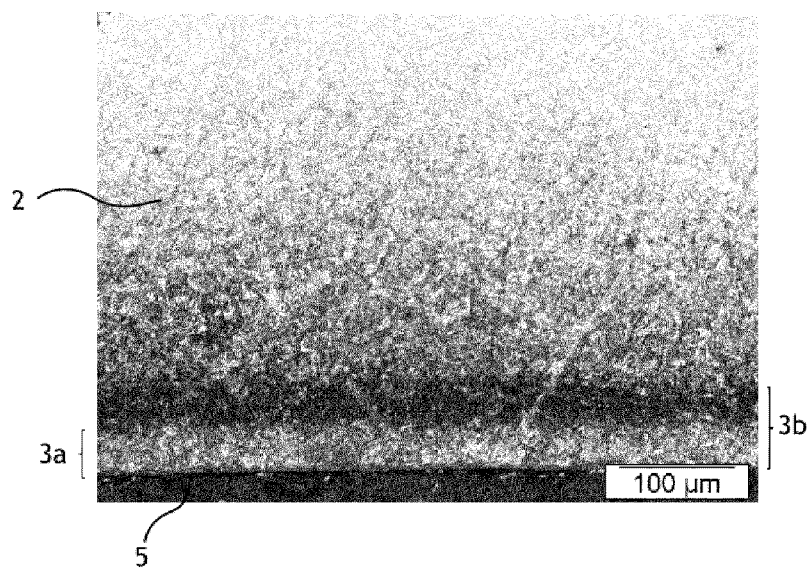
[Fig. 4]
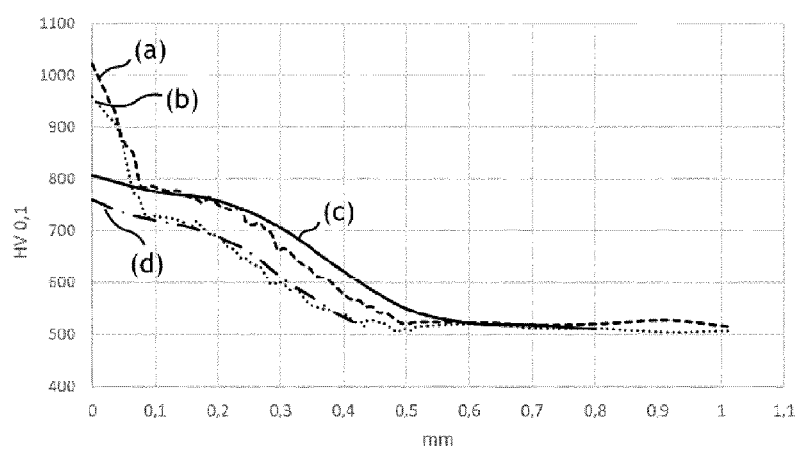

[Fig. 5]
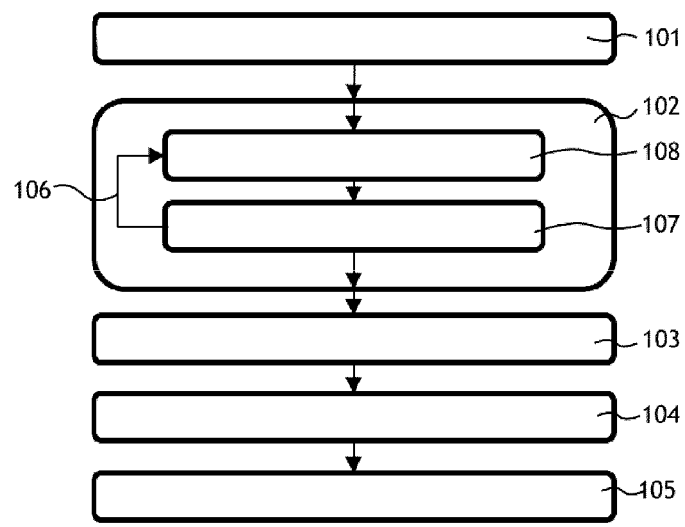
[Fig. 6]
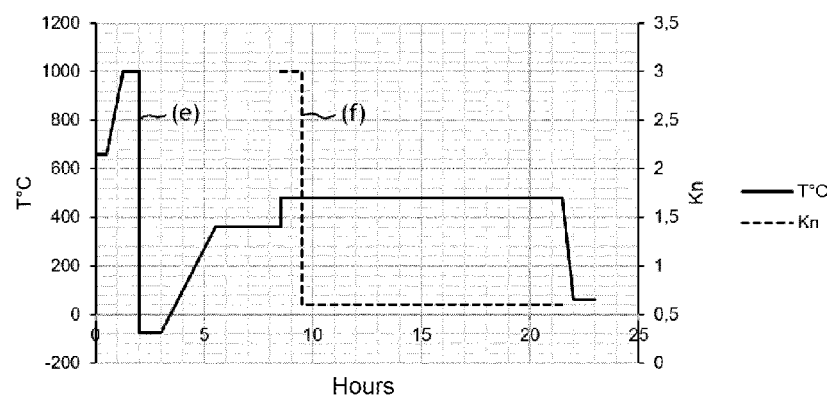

CASE-HARDENED STEEL PART FOR USE IN AERONAUTICS

FIELD OF THE INVENTION

The present invention relates to a steel part for use in aeronautics, preferably a power transmission gear, for use in aeronautics. The present invention also relates to a process for manufacturing such a part.

RELATED ART

A part for use un aeronautics, in particular a power transmission gear, is typically made of steel. The steel used is typically selected so as to maximize both the temperature resistance, the Hertzian fatigue strength, the low-cycle fatigue strength and the resistance to incrustations from a foreign body. The term "steel" in the present invention refers to a metal alloy comprising predominantly iron, and comprising carbon, wherein the mass fraction of carbon is comprised between 0.008% and 2%.

Two types of steel can be used in a known way to increase temperature resistance: Ferrium® C61™ and Ferrium® C64™, developed by QuesTek company. Ferrium® C61™ is a steel, having an average mass fraction of carbon comprised between 0.13% and 0.17%, an average mass fraction of cobalt comprised between 17.5% and 18.5%, a sum of the average mass fraction of molybdenum and the average mass fraction of tungsten comprised between 0.9% and 1.3%, and an average mass fraction of nickel comprised between 9.2% and 9.8%. Ferrium® C64™ is a steel also developed by QuesTek company, having an average mass fraction of carbon comprised between 0.09% and 0.13%, an average mass fraction of cobalt comprised between 15.5% and 17%, an average mass fraction of aluminum of less than 0.1% and an average mass fraction of nickel comprised between 7.2% and 7.8%. However, the compositions of Ferrium® C61™ and Ferrium® C64™ do not have sufficient fatigue strength for certain applications, such as power transmission in aeronautics.

To this end, Ferrium® C61™ and Ferrium® C64™ can be case-hardened. The term "case-hardening" or "carburizing" refers to a thermochemical treatment which allows carbon to penetrate the surface of the steel part. Thus, case-hardening by means of this enrichment in the form of a negative carbon gradient in the direction of the core of the part makes it possible to generate a surface martensite layer that is harder and stronger than in the core of the part. The document by Kern et al. (Kern, C. P., Wright, J. A., Sebastian, J. T., Grabowski, J. L., Jordan, D. F., & Jones, T. M., 2011, *Manufacturing and Processing of a New Class of Vacuum-Carburized Gear Steels with Very High Hardenability*, AGMA Technical Paper 11FTM27) describes a treatment of Ferrium® C61™ and Ferrium® C64™ comprising the steps of:
- case-hardening at a temperature of 1000° C. in the austenitic range of the steel,
- gas quenching,
- cryogenic treatment at a temperature comprised between −50° C. and −100° C., and
- aging the part at a temperature comprised between 400° C. and 500° C., in a neutral gas atmosphere.

However, although the case-hardened steel thus obtained has an increased fatigue strength compared with a steel obtained without case-hardening, this strength is still insufficient to use the steel obtained in certain industrial applications.

To this end, it is known to shot peen case-hardened Ferrium® C61™ or Ferrium® C64™. Shot peening compresses a surface layer of the steel part by projecting microbeads onto the surface of the part. Shot peening thus increases the fatigue strength of the part by introducing residual compressive stresses. However, the shot peening step makes the production of the part more complex and increases the roughness of the part. Shot peening can also be ineffective when the part is used at high temperatures, for example at temperatures greater than 400° C. Indeed, the compressive stresses obtained by shot peening can be reduced by the relaxation of residual stresses in the part at temperatures greater than 500° C.

DISCLOSURE OF THE INVENTION

One aim of the invention is to propose a solution for increasing the hardness of a part for use in aeronautics made of case-hardened Ferrium® C61™ or Ferrium® C64™, while avoiding the disadvantages associated with shot peening the part.

This aim is achieved in the context of the present invention by virtue of a process for manufacturing a steel part for use un aeronautics comprising the consecutive steps of:
a) providing a part comprising a substrate, the substrate comprising at least carbon, cobalt, aluminum and nickel, and having
- an average mass fraction of carbon comprised between 0.09% and 0.17%,
- an average mass fraction of cobalt comprised between 15.5% and 18.5%,
- an average mass fraction of aluminum of less than 0.1%, and
- an average mass fraction of nickel comprised between 7.2% and 9.8% b) case-hardening the part in a controlled atmosphere at a temperature comprised between 900° C. and 1100° C.,
c) quenching the part and cryogenically treating the part in a controlled atmosphere at a temperature comprised between −50° C. and −100° C., and
d) aging the part in a controlled atmosphere at a temperature comprised between 450° C. and 550° C.,
the process being characterized in that the aging comprises nitriding the part in an atmosphere comprising ammonia so that the part comprises a nitrided surface, and in that the nitriding is simultaneous with the aging of the part.

Advantageously, the case-hardening of the part is carried out in such a way that at least a portion of the surface of the part has an average mass fraction of carbon comprised between 0.4% and 0.6%.

Advantageously, the part comprises a surface, the surface having a carbon surface content, and the case-hardening step of the process comprises a repetition of carbon enrichment cycles of the part, each carbon enrichment cycle comprising the substeps of:
b1) injecting a carburizing gas into a carburizing chamber containing the part, so as to enrich the surface of the part with carbon and to increase the surface carbon content of the part to a predetermined maximum surface carbon content, the temperature in the chamber being maintained between 900° C. and 1100° C., for a time $t_1$ comprised between 60 s and 300 s, and
b2) injecting a neutral gas into the carburizing chamber for a time $t_2$ comprised between 15 s and 2000 s, so as to cause the carbon to diffuse from the surface to the interior of the part, and to cause the surface carbon content to decrease to a predetermined minimum surface carbon content.

Advantageously, step b) of case-hardening comprises an injection of a carburizing gas into a carburizing chamber containing the part, the carburizing gas being at least selected from propane and acetylene.

Another subject matter of the invention is a steel part for use in aeronautics obtainable by a process of the invention, the part comprising a substrate, and the substrate comprising at least carbon, cobalt, aluminum and nickel, and having
- an average mass fraction of carbon comprised between 0.09% and 0.17%,
- an average mass fraction of cobalt comprised between 15.5% and 18.5%,
- an average mass fraction of aluminum of less than 0.1%,
- an average mass fraction of nickel comprised between 7.2% and 9.8%, the part being characterized in that the part is case-hardened and nitrided, so that it comprises a nitrided layer, the nitrided layer at least partially covering the substrate and
- the nitrided layer has a thickness comprised between 5 μm and 180 μm, preferentially comprised between 50 μm and 150 μm, an average mass fraction of carbon being comprised between 0.4% and 0.6% and an average mass fraction of nitrogen being comprised between 0.6% and 3% and preferentially between 0.3% and 1%.
- the substrate has an average mass fraction of carbon comprised between 0.13% and 0.17%, an average mass fraction of cobalt comprised between 17.5% and 18.5%, a sum of the average mass fraction of molybdenum and the average mass fraction of tungsten comprised between 0.9% and 1.3%, and an average mass fraction of nickel comprised between 9.2% and 9.8%,
- the substrate has an average mass fraction of carbon comprised between 0.09% and 0.13%, an average mass fraction of cobalt comprised between 15.5% and 17%, an average mass fraction of aluminum of less than 0.1%, an average mass fraction of nickel comprised between 7.2% and 7.8%.
- the nitrided layer comprises at least one element selected from nitride precipitates and carbonitride precipitates,
- the nitrided layer has a predominantly martensitic phase.

Another subject matter of the invention is a power transmission gear, comprising a steel part according to the invention.

DESCRIPTION OF THE FIGURES

Other features, aims and advantages of the invention will emerge from the following description, which is purely illustrative and non-limiting, and which should be read in conjunction with the appended drawings wherein:

FIG. 1 schematically illustrates a power transmission gear according to a particular embodiment of the invention.

FIG. 2 is a microphotograph of a cross-section of a part according to an embodiment of the invention, wherein the part comprises a Ferrium® C61™ substrate.

FIG. 3 is a microphotograph of a cross-section of a part according to an embodiment of the invention, wherein the part comprises a Ferrium® C64™ substrate.

FIG. 4 is a diagram illustrating the Vickers hardness profile of two parts according to two particular embodiments of the invention and of two known parts.

FIG. 5 illustrates a process for manufacturing a part according to a particular embodiment of the invention.

FIG. 6 schematically illustrates the temperature of a chamber containing a part according to an embodiment of the invention and the controlled nitriding potential in the chamber during aging of the part.

DETAILED DESCRIPTION OF THE INVENTION

General Architecture of the Part 1

With reference to FIG. 1, the part 1 is a steel part for use un aeronautics, comprising a substrate 2, a case-hardened layer 3b at least partially covering the substrate 2, and a nitrided layer 3a at least partially covering the substrate 2. The part 1 has an outer surface 5. The nitrided layer 3a may merge at least partially or completely with a case-hardened layer 3b. Indeed, the characteristic penetration lengths of the carbon and nitrogen atoms during case-hardening and nitriding, respectively, result in the formation of a case-hardened layer 3b and a nitrided layer 3a, both formed from the surface 5 of the part 1 and to depths which may be different depending on the layer considered.

A power transmission gear 4 preferentially comprises the part 1. The power transmission gear 4 may be used to transmit power from an engine to a rotor, for example the main rotor of a helicopter.

The substrate 2 comprises at least carbon, cobalt, aluminum and nickel, and has an average mass fraction of carbon comprised between 0.09% and 0.17%, an average mass fraction of cobalt comprised between 15.5% and 18.5%, an average mass fraction of aluminum of less than 0.1%, an average mass fraction of nickel comprised between 7.2% and 9.8%. Thus, the substrate 2 is a steel whose mechanical properties are close to or equal to the mechanical properties of Ferrium® C61™ and/or Ferrium® C64™.

Preferentially, the nitrided layer 3a has an average mass fraction of carbon comprised between 0.4% and 0.6%. Indeed, this fraction of carbon, lower than the fraction of carbon of a case-hardened part of the prior art, makes it possible to nitride the part in such a way as to increase its hardness while avoiding the disadvantages associated with the formation of undesirable phases such as residual austenite and/or intergranular precipitate networks.

Preferentially, the substrate 2 has an average mass fraction of carbon comprised between 0.13% and 0.17%, an average mass fraction of cobalt comprised between 17.5% and 18.5%, a sum of the average mass fraction of molybdenum and the average mass fraction of tungsten comprised between 0.9% and 1.3%, an average mass fraction of nickel comprised between 9.2% and 9.8%. Thus, the substrate 2 has the mechanical properties of Ferrium® C61™.

Preferentially and/or alternatively, the substrate 2 has an average mass fraction of carbon comprised between 0.09% and 0.13%, an average mass fraction of cobalt comprised between 15.5% and 17%, an average mass fraction of aluminum of less than 0.1%, an average mass fraction of nickel comprised between 7.2% and 7.8%. Thus, the substrate 2 has the mechanical properties of Ferrium® C64™.

With reference to FIG. 2 and FIG. 3, the nitrided layer 3a has a thickness comprised between 5 μm and 180 μm, preferentially comprised between 50 and 150 μm, and the average mass fraction of nitrogen in the nitrided layer 3a is comprised between 0.2% and 3% and preferentially between 0.3% and 1%. Thus, the hardness of the part is higher than the hardness of a part made of case-hardened Ferrium® C61™ or case-hardened Ferrium® C64™, while retaining the mechanical properties of Ferrium® C61™ or Ferrium®

C64™ (such as temperature resistance) and avoiding the disadvantages associated with shot peening the part.

With reference to FIG. 2, the composition of the substrate 2 may be that of Ferrium® C61™ at a sufficiently large distance from the surface 5, i.e., at a distance greater than 250 μm from the surface 5, and preferentially greater than 500 μm. The nitrided layer 3a covers the substrate 2, and comprises the surface 5 on the side of the nitrided layer 3a opposite the substrate 2. The nitrided layer 3a has, from the surface 5:

preferentially a surface combination layer, having for example a thickness from the surface comprised between 0 μm and 30 μm, and comprising at least predominantly and preferentially exclusively nitrides, and then a diffusion layer, for example with a thickness comprised between 50 μm and 150 μm, located under the combination layer.

The diffusion layer comprises nitrogen, the average mass concentration of nitrogen in the diffusion layer being strictly lower than the mass concentration of nitrogen in the combination layer. In this layer the nitrogen can be disseminated into the case-hardened Ferrium® C61™ or C64™ in the form of nitride precipitates and/or carbonitride precipitates.

With reference to FIG. 3, the composition of the substrate 2 may be that of Ferrium® C64™ at a sufficiently large distance from the surface 5, i.e., at a distance greater than 250 μm from the surface 5, and preferentially greater than 500 μm. The nitrided layer 3a covers the substrate 2, and comprises the surface 5 on the side of the nitrided layer 3a opposite the substrate 2. The substrate 2 may comprise a diffusion layer in contact with the nitrided layer 3a. The diffusion layer comprises nitrogen, the average mass concentration of nitrogen in the diffusion layer being strictly lower than the mass concentration of nitrogen in the nitrided layer 3a.

With reference to FIG. 4, the nitrided layer 3a of the part 1 according to an embodiment of the invention significantly increases the hardness of the part 1 compared with a known case-hardened Ferrium® C61™ part and/or a known case-hardened Ferrium® C64™ part. Curve (a) illustrates the hardness profile of the part 1 according to an embodiment of the invention, the part 1 comprising a Ferrium® C64™ substrate. The hardness measured is the Vickers hardness (HV). Curve (b) illustrates the hardness profile of the part 1 according to an embodiment of the invention, the part 1 comprising a Ferrium® C61™ substrate. Curve (c) illustrates the hardness profile of a known case-hardened part comprising a Ferrium® C64™ substrate. Curve (d) illustrates the hardness profile of a known case-hardened part comprising a Ferrium® C61™ substrate. On the surface, the hardness of a part according to an embodiment of the invention may be greater than 200 HV of the hardness of a known case-hardened Ferrium® C61™ or Ferrium® C64™ part.

The nitrided layer 3a preferentially comprises at least one element selected from nitride precipitates and carbonitride precipitates. Thus, the hardness of the part 1 can be increased.

Process for Manufacturing the Part 1

FIG. 5 schematically illustrates a process for manufacturing the part 1 according to an embodiment of the invention. The process comprises a step 101 of providing a part comprising at least carbon, cobalt, aluminum and nickel. The part has an average mass fraction of carbon comprised between 0.09% and 0.17%, an average mass fraction of cobalt comprised between 15.5% and 18.5%, an average mass fraction of aluminum of less than 0.1%, and an average mass fraction of nickel comprised between 7.2% and 9.8%. Preferentially, the part may be made of Ferrium® C61™, i.e., it has an average mass fraction of carbon comprised between 0.13% and 0.17%, an average mass fraction of cobalt comprised between 17.5% and 18.5%, a sum of the average mass fraction of molybdenum and the average mass fraction of tungsten comprised between 0.9% and 1.3%, and an average mass fraction of nickel comprised between 7.2% and 9.8%. Preferentially, the part can also be made of Ferrium® C64™, i.e., it has an average mass fraction of carbon comprised between 0.09% and 0.13%, an average mass fraction of cobalt comprised between 15.5% and 17%, an average mass fraction of aluminum of less than 0.1%, an average mass fraction of nickel comprised between 7.2% and 7.8%.

The process comprises a step 102 of case-hardening the part in a chamber whose atmosphere is controlled at a temperature comprised between 900° C. and 1100° C. The case-hardening step 102 may preferentially comprise several carbon enrichment cycles 106 of the surface. An enrichment cycle 106 comprises a substep of injecting a carburizing gas 107 and a substep of injecting a neutral gas 108.

During the substep of injecting a carburizing gas 107, a carburizing gas is injected into the carburizing chamber containing the part, so as to enrich the surface of the part with carbon and to increase the surface carbon content of the part to a predetermined maximum surface carbon content. The temperature in the chamber is maintained between 900° C. and 1100° C., for a time $t_1$ for example comprised between 60 s and 300 s. The carburizing gas may be selected at least from propane and acetylene. The dilution ratio of the injected carburizing gas may be comprised between 5% and 75%, preferably between 10% and 25%, and the carburizing gas may be injected at a pressure comprised between 0.1 bar and 3 bar, preferably equal to 230±50 mbar. The term "dilution" refers to the dilution of the carburizing gas in a neutral gas, for example argon or dinitrogen.

During the substep of injecting a neutral gas 108, a neutral gas is injected into the carburizing chamber for a time $t_2$ comprised between 20 minutes and 3 hours, so as to cause the carbon to diffuse from the surface to the interior of the part, and to decrease the surface carbon content to a predetermined minimum surface carbon content. The neutral gas may be selected from argon and dinitrogen. The succession of enrichment cycles 106 allows the part to be enriched in carbon while preventing the mass fraction of carbon on the surface of the part from exceeding the predetermined upper surface content.

The case-hardening 102 is followed by a quenching 103. The quenching 103 comprises the injection of a gas, for example a neutral gas, at room temperature, i.e., comprised between 0° C. and 50° C., into the carburizing chamber, so as to stop the carburizing reaction and cause a martensitic transformation. The quenching step 103 makes it possible to transform the austenite predominantly into the martensitic phase.

The quenching 103 is followed by a cryogenic treatment 104. The cryogenic treatment comprises controlling the temperature in the chamber containing the part at a temperature comprised between −100° C. and −50° C. The cryogenic treatment step 104 makes it possible to transform, in addition to the quenching 103, the residual part of the austenitic phase of the part into the martensitic phase. After the cryogenic treatment 104, the part has at least predominantly a martensitic phase, in particular 90% by volume of martensitic phase, and even more preferentially only a martensitic phase.

The cryogenic treatment 104 is followed by an aging 105 of the part. The aging 105 of the part is carried out by controlling the temperature in the chamber of the part at a temperature comprised between 450° C. and 550° C., and preferentially at a temperature comprised between 480° C. and 500° C. Even more preferentially, when the substrate 2 of the part has the composition of Ferrium® C61™, the aging temperature is comprised between 480° C. and 485° C. Thus, it is possible to optimize the aging of the part without causing a phase change of the martensitic phase. Even more preferentially, when the substrate 2 of the part has the composition of Ferrium® C64™, the aging temperature is comprised between 490° C. and 500° C. Thus, it is possible to optimize the aging of the part without causing a phase change in the martensitic phase.

The inventors have discovered that it is possible to combine aging of the part with nitriding of the part. In other words, nitriding is performed in the process according to the embodiment of the invention simultaneously with aging of the part. The simultaneous implementation of aging and nitriding is achieved by injecting ammonia, preferentially dissociated ammonia, into the chamber during the aging of the part. The formation of the nitrided layer 3a is controlled by imposing the nitrogen potential ($K_n$) in the chamber. For example, the imposition of a $K_n$ equal to 3 for one hour, followed by the imposition of a $K_n$ equal to 0.6 for 11 hours makes it possible to confer a nitrided layer 3a meeting the expectations of increasing the level of hardness of the surface layers while avoiding the formation of undesirable metallurgical phases (such as an intergranular network of carbonitrides for example).

Indeed, it is impossible to combine aging and nitriding for most steel alloys. Nitriding must be carried out at a temperature lower than the tempering temperature of the steel alloy, in order to avoid the transformation of the martensitic phase of the part via the formation of carbide precipitates responsible for metallurgical softening. However, for most steel alloys used in the case-hardened state for pinioning applications, the tempering temperature is well below the minimum temperature required for nitriding. For example, for a steel alloy having an average mass fraction of carbon equal to 0.16%, an average mass fraction of nickel equal to 3.20%, an average mass fraction of chromium equal to 1.00% and an average mass fraction of molybdenum equal to 0.16%, the tempering temperature in the case-hardened condition is less than or equal to 190° C. This temperature is too low to allow the nitriding of a part in such a steel alloy simultaneously with the tempering of the part. Indeed, nitriding requires a higher temperature, preferentially higher than 450° C. Thus, in the process according to an embodiment of the invention, the simultaneous aging and nitriding makes it possible to simplify the manufacturing process of the part 1.

With reference to FIG. 6, curve (e) illustrates the controlled temperature in the chamber containing the part with respect to the processing time of the part, during a process according to an embodiment of the invention. Curve (f) illustrates the controlled nitrogen potential $K_n$ in the chamber with respect to the processing time of the part, during a process according to an embodiment of the invention. The term "nitrogen potential" refers to the ratio $p_{NH3}/p^{3/2}_{H2}$, where $p_{NH3}$ is the partial pressure of ammonia which dissociates at the surface 5 of the part to give monoatomic nitrogen which will diffuse into the ferritic matrix, and $p^{3/2}_{H2}$ is the partial pressure of dihydrogen at the surface 5 raised to the power of 3/2.

During aging 105, the dissociated ammonia may be injected in a first phase at a flow rate allowing a nitrogen potential comprised between 1 and 5, preferentially comprised between 2.5 and 3.5. The duration of the first phase is comprised between 20 min and 2 h, preferentially between 50 min and 70 min. The dissociated ammonia can be injected during a second phase at a flow rate that allows a nitrogen potential comprised between 0.1 and 1, preferentially comprised between 0.3 and 0.8, to be achieved. The duration of the second phase is greater than 5 hours and preferentially comprised between 10 and 12 hours.

The invention claimed is:

1. A process for manufacturing a steel part for use in aeronautics
   comprising the consecutive steps of:
   a) providing a part comprising a substrate, the substrate comprising at least carbon, cobalt, aluminum and nickel, and having
      an average mass fraction of carbon comprised between 0.09% and 0.17%,
      an average mass fraction of cobalt comprised between 15.5% and 18.5%,
      an average mass fraction of aluminum of less than 0.1%, and
      an average mass fraction of nickel comprised between 7.2% and 9.8
   b) case-hardening the part in a controlled atmosphere at a temperature comprised between 900° C. and 1100° C.,
   c) quenching the part and cryogenically treating the part in a controlled atmosphere at a temperature comprised between −50° C. and −100° C., and
   d) aging the part in a controlled atmosphere at a temperature comprised between 450° C. and 550° C.,
   wherein the case-hardening of step b) is carried out so that at least a portion of a surface of the part has an average mass fraction of carbon comprised between 0.4% and 0.6%, and wherein the aging comprises nitriding the part in an atmosphere comprising ammonia so that the part comprises a nitrided layer at least partially covering the substrate,
   nitriding being simultaneous with aging of the part,
   wherein the formation of the nitrided layer is made in a chamber and wherein the formation of the nitrided layer is controlled by imposing in the chamber a nitrogen potential $K_n$ equal to 3 for one hour, followed by the imposition of $K_n$ equal to 0.6 for 11 hours.

2. The process for manufacturing a part as claimed in claim 1, wherein step b) of case-hardening comprises an injection of a carburizing gas into a carburizing chamber containing the part, the carburizing gas being at least selected from propane and acetylene.

3. The process as claimed in claim 1, wherein the nitrided layer has an average mass fraction of nitrogen comprised between 0.6% and 3%.

4. The process as claimed in claim 1, wherein the nitrided layer has a thickness comprised between 5 μm and 180 μm.

5. The process as claimed in claim 1, wherein the substrate has:
   an average mass fraction of carbon comprised between 0.13% and 0.17%,
   an average mass fraction of cobalt comprised between 17.5% and 18.5%, a sum of an average mass fraction of molybdenum and an average mass fraction of tungsten comprised between 0.9% and 1.3%, an average mass fraction of nickel comprised between 9.2% and 9.8%.

6. The process as claimed in claim 1, wherein the substrate has:

an average mass fraction of carbon comprised between 0.09% and 0.13%, an average mass fraction of cobalt comprised between 15.5% and 17%, an average mass fraction of aluminum of less than 0.1%, an average mass fraction of nickel comprised between 7.2% and 7.8%.

7. The process as claimed in claim 1, wherein the nitrided layer comprises at least one element selected from nitride precipitates and carbonitride precipitates.

8. The process as claimed in claim 1, wherein the nitrided layer has a predominantly martensitic phase.

* * * * *